United States Patent [19]

Naito et al.

[11] Patent Number: 4,748,606
[45] Date of Patent: May 31, 1988

[54] EXTERNAL MAGNETIC FIELD INVERTING APPARATUS FOR MAGNETO-OPTICAL DISC APPARATUS

[75] Inventors: Takashi Naito; Susumu Tosaka, both of Shinagawa, Japan

[73] Assignee: Sony Corporation, Tokyo, Japan

[21] Appl. No.: 12,458

[22] PCT Filed: Apr. 28, 1986

[86] PCT No.: PCT/JP86/00216
§ 371 Date: Dec. 29, 1986
§ 102(e) Date: Dec. 29, 1986

[87] PCT Pub. No.: WO86/06534
PCT Pub. Date: Nov. 6, 1986

[30] Foreign Application Priority Data

Apr. 29, 1985 [JP] Japan ................................. 60-91992
Nov. 20, 1985 [JP] Japan ................................. 60-260387

[51] Int. Cl.⁴ .................... G11B 5/03; G11B 13/04; G11B 11/14
[52] U.S. Cl. .................... 369/13; 360/114; 360/59; 365/122
[58] Field of Search .................... 369/13; 360/114, 59; 365/122

[56] References Cited

U.S. PATENT DOCUMENTS 4,701,895 10/1987 Vansant ................................. 369/13

FOREIGN PATENT DOCUMENTS 57-24047 2/1982 Japan .
59-38951 3/1984 Japan ................................. 369/13
59-92406 5/1984 Japan .
2083677 3/1982 United Kingdom ................. 369/13

Primary Examiner—Raymond F. Cardillo
Assistant Examiner—Hoa T. Nguyen
Attorney, Agent, or Firm—Hill, Van Santen, Steadman & Simpson

[57] ABSTRACT

The present invention relates to an external magnetic field inverting apparatus for magneto-optical disc apparatus in which a permanent magnet (15) is used as external magnetic field generating means and a winding (25) is located so as to surround the permanent magnet (15), and the permanent magnet (15) can be half-rotated in a desired direction by a rotation force generated by a repulsive force by an external magnetic field Hm generated by this permanent magnet (15) and a magnetic field Hc resulting from supplying a current to the winding (25), whereby the apparatus of the invention can be reduced in cost, increased in reliability and miniaturized in size.

7 Claims, 5 Drawing Sheets

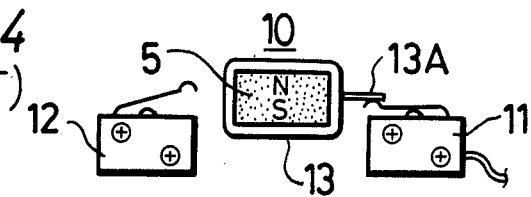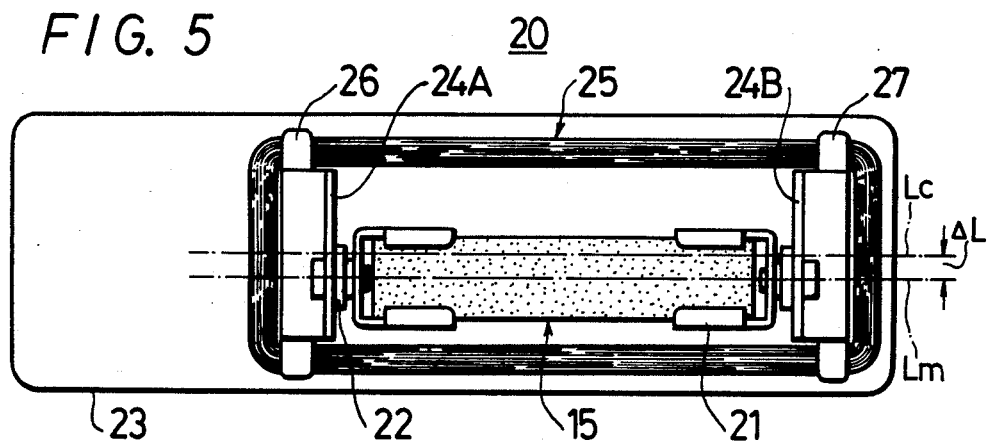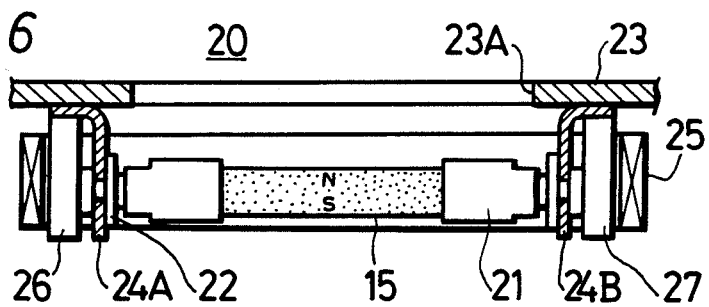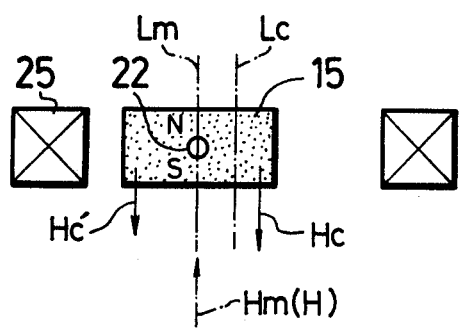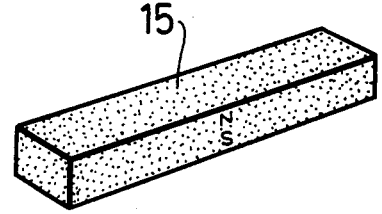

EXTERNAL MAGNETIC FIELD INVERTING APPARATUS FOR MAGNETO-OPTICAL DISC APPARATUS

DESCRIPTION

1. Technical Field

The present invention relates to an external magnetic field inverting apparatus for use with a magneto-optical disc apparatus. Particularly, this invention uses a permanent magnet as external magnetic field forming means and locates a winding so as to surround the permanent magnet, wherein when a rotation force generated on the basis of a repulsive force between an external magnetic field formed by the permanent magnet and a magnetic field resulting from supplying a current to the winding is applied to the permanent magnet, the permanent magnet can be half-rotated in a desired direction. Thus, an external magnetic field inverting apparatus which is inexpensive, reliable and small in size can be made.

2. Background Art

There is already known a magneto-optical disc apparatus which can record and reproduce a data by using a magneto-optical disc (for example, Japanese laid-open patent application No. 58-14306 and Japanese laid-open patent application No. 57-133537).

The fundamental concept of this magneto-optical disc apparatus will be described with reference to FIGS. 1 and 2. In FIG. 1, reference numeral 1 designates a magneto-optical disc. Before a data is recorded on the magneto-optical disc, it is magnetized uniformly in the same direction (downward direction) as, for example, shown in the Figures. An optical pickup apparatus 2 is located in opposing relation to one surface of the disc 1 to record the data on the disc surface and to reproduce the data therefrom. It is known that the optical pickup apparatus 2 utilizes a laser (semiconductor laser and the like) to record and to reproduce the data. The laser is converged by an objective lens 3 on the disc surface as an optical path 3a.

An electromagnet 5 as the external magnetic field forming means is located at the disc surface opposite to the optical pickup apparatus 2 in facing relation to the optical pickup apparatus 2. This electromagnet 5 generates an external magnetic field H vertical to the disc surface as shown in the figures.

When the optical pickup apparatus 2 is moved to a predetermined disc surface and irradiates a laser thereon so that the disc surface is heated to a temperature (for example, 400° C.) higher than Curie temperature, the magnetic domains in the heated portion become irregular. Under this condition, when a predetermined current is flowed to the electromagnet 5 such that an external magnetic field H (FIG. 2) opposite to the external magnetic field H shown in FIG. 1 is applied to the disc, the magnetization direction of the heated portion within the disc 1 becomes the same direction as that of the external magnetic field H as indicated by a broken line. Accordingly, under this condition, if the irradiation of the laser is stopped, the internal magnetic field is kept as shown by the broken line. In order to invert the direction of the internal magnetic field next time, it is sufficient that the external magnetic field H is inverted as shown in FIG. 1 and the above mentioned scanning is executed. Then, "0" assumes, for example, the magnetization direction shown in FIG. 1 and "1" the magnetization direction shown by the broken line in FIG. 2. Under this assumption, if the magnetization scanning is carried out sequentially at a predetermined pitch in the circumferential direction of the disc 1, it is possible to record (including re-recording) the data "0" and "1" on the disc along the circumferential direction thereof.

The external magnetic field forming means is not limited to the electromagnet but can use a permanent magnet. FIG. 3 is a diagram showing an example of an external magnetic field inverting apparatus 10 which uses a permanent magnet 5 as the external magnetic field forming means. The flat rectangular solid-shaped permanent magnet 5 that is magnetized with the illustrated polarities is located in opposing relation to the disc 1 and rotatably mounted to the apparatus. Its rotary shaft 6 is coupled to the rotary shaft of a stepping motor 7 through coupling means 8.

The motor 7 is controlled on the basis of a drive signal from a system controller (not shown) and the permanent magnet 5 is half-rotated on the basis of the rotation of the motor 7. The half-rotated condition of the permanent magnet is detected by a pair of switches 11 and 12 shown in FIG. 4.

To this end, as shown in FIG. 4, a projected member 13A is attached to a holder 13 which incorporates the permanent magnet 5 and the pair of switches 11 and 12 are located respectively at the positions to which the permanent magnet 5 is rotated by 180°. Then, the supply of the drive signal to the motor 7 is stopped by a signal obtained when the projected member 13A contacts with the switches 11 and 12. Thus, the half-rotated condition of the permanent magnet 5 can be stabilized.

When the external magnetic field inverting apparatus 10 is constructed by using the permanent magnet instead of the electromagnet as described above, there arise the following problems.

Since the external magnetic field inverting apparatus 10 employs the stepping motor 7 as a drive source for inverting the permanent magnet 5, it requires, in addition to the motor 7, circuits such as a driver and so on. This increases the manufacturing cost of the apparatus on the whole. Further, since the apparatus is constructed by using parts for consumption such as the motor 7, the pair of switches 11, 12 and so on, the apparatus is short in life span, poor in reliability and can not be miniaturized because of attaching the motor 7 and the like.

DISCLOSURE OF INVENTION

The present invention intends to solve the problems inherent in the prior art apparatus and intends to provide an external magnetic field inverting apparatus for a magneto-optical disc apparatus which can be made low in cost, high in reliability and miniaturized in size.

According to the present invention, a winding is located so as to surround a rotatable permanent magnet and the permanent magnet is applied with a rotation force in a desired direction on the basis of a repulsive force generated between the magnetic field of the permanent magnet and a magnetic field which results from supplying a current to the winding.

It is possible to apply the rotational force to the permanent magnet by displacing the center of the magnetic field of the permanent magnet and the center of the magnetic field generated from the magnetic field winding.

According to this arrangement, since the repulsive forces generated between the magnetic fields resulting from supplying the current to the winding and the magnetic field of the permanent magnet itself are different at the center of the rotation of the permanent magnet, it is possible to rotate the permanent magnet in the desired direction (clockwise direction or counter-clockwise direction) by the difference of the repulsive forces. If the winding remains as is conducted, the permanent magnet is stabilized under the half-rotated state. The reason for this is that the magnetic field of the permanent magnet and the magnetic field of the winding become same in direction, and hence the repulsive force applied to the permanent magnet disappears.

As a result, the direction of the external magnetic field passing through the disc is inverted. When inverting the direction of this external magnetic field next time, if a current opposite to the above mentioned current is flowed to the winding, the permanent magnet is further half-rotated and stabilized in that state due to the similar reason.

If the magnetic field of the permanent magnet is utilized positively and only the magnetic field is generated from the winding at a necessary time, it is possible to freely alter the opposing polarity of the permanent magnet relative to the disc surface.

According to the arrangement of the invention in which the rotation force given to the permanent magnet is formed by the magnetic field of the permanent magnet and the magnetic field of the winding, the apparatus can be miniaturized in size and the apparatus can be made high in reliability.

BRIEF DESCRIPTION OF DRAWINGS

FIG. 4 is a partial diagram showing the operation state thereof, FIG. 5 is a plan view showing an embodiment of an external magnetic field inverting apparatus according to the present invention, FIG. 6 is a cross-sectional side view of FIG. 5, FIG. 7 is a longitudinally cross-sectional view of a main portion in FIG. 5, FIG. 8 is a perspective view showing an example of a permanent magnet.

BEST MODE FOR CARRYING OUT THE INVENTION

Figure 1:
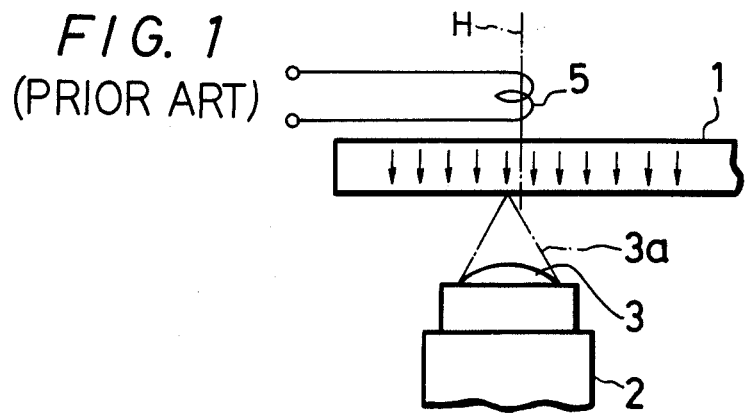
FIGS. 1 and 2 are conceptual explanatory diagrams for known magneto-optical recordings.
Figure 2:
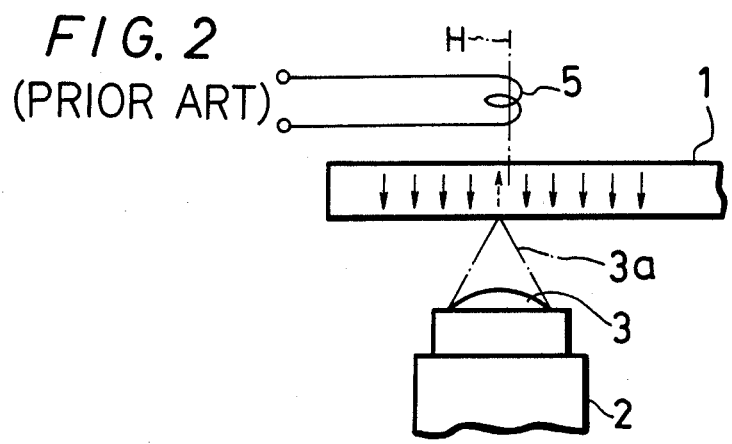
Figure 3:
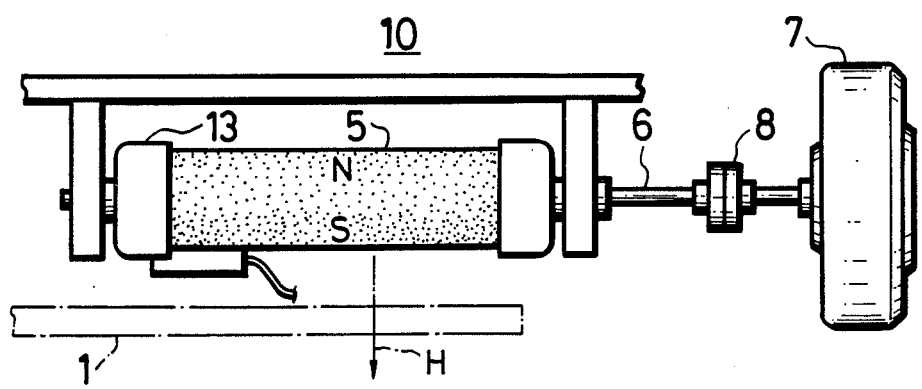
FIG. 3 is a constructional diagram showing an example of a prior art external magnetic field inverting apparatus.

An embodiment of an external magnetic field inverting apparatus 20 according to the present invention will be described in detail with reference to FIG. 5 and the following drawings.

As shown in FIG. 8, a permanent magnet used in this apparatus is formed as a flat rectangular solid and magnetized such that one flat surface becomes an S pole and another surface becomes an N pole. The permanent magnet 15 is attached to a holder 21 shown in FIGS. 5 and 6 and rotary shafts 22 are attached to both ends of the holder 21. These rotary shafts are supported rotatably by a pair of attaching members (bearing members) 24A and 24B formed on a main attaching plate 23.

Around the permanent magnet 15, as shown in FIG. 5, there is located a winding 25 with a predetermined number of turns so as to surround this permanent magnet 15. In this case, the attaching positions of the permanent magnet 15 and the winding 25 are respectively selected such that the rotation center Lm of the permanent magnet 15 and the center Lc of the winding in the direction of the rotary shaft 22 are displaced from each other by $\Delta L$, that is, in this embodiment, the rotation center Lm of the permanent magnet is located lower than the center Lc of the winding 25 by $\Delta L$.

Reference numerals 26 and 27 designate engagement members used to define the surrounding position of the winding 25. These engagement members are both fixed to the main attaching plate 23.

FIG. 7 shows a main portion of the longitudinal cross section of FIG. 5. For convenience sake of explanation, the polarity of the permanent magnet 15 is taken as the N pole on its upper portion and as the S pole on its lower portion. Also, let it be assumed that under this state, a predetermined current is supplied to the winding 25 to generate a downward winding magnetic field Hc. At that time, since the magnetic field Hc becomes maximum at the center Lc of the winding, a relationship between a magnitude of a right-hand side magnetic field Hc and a left-hand side magnetic field Hc′ with respect to the rotary shaft 22 of the permanent magnet 15 located within this magnetic field Hc becomes as $Hc > Hc'$ On the other hand, since the magnetic field Hm of the permanent magnet 15 is equal at both sides of the rotary shaft 22 and the magnetic field Hm faces upward with the polarity shown in FIG. 7, there are generated repulsive forces between these magnetic fields Hc and Hm and between the magnetic fields Hc′ and Hm. Further, a relationship among the winding magnetic fields Hc, Hc′ and the magnetic field Hm of the permanent magnet 15 is selected so as to satisfy $Hc, Hc' < < Hm$ In the illustrated case, since $Hc > Hc'$ is satisfied, the repulsive force at the right side of the rotary shaft 22 becomes larger than the repulsive force at the left side, rotating the permanent magnet 15 in the counter-clockwise direction.

When the permanent magnet 15 is half-rotated, the polarity of the permanent magnet 15 becomes opposite to the illustrated one so that the magnetic field Hm faces downward. Consequently, in this case, there is generated no repulsive force.

If the winding 25 is supplied with the current continuously after the permanent magnet 15 is half-rotated, the rotation position of the permanent magnet 15 is not fluctuated by an external disturbance and hence, the rotation state of the permanent magnet is stabilized.

In order that the permanent magnet 15 is recovered to the original rotation state, it is sufficient to supply to the winding 25 the current opposite to the former. If so, upward winding magnetic fields Hc and Hc' are generated at that time and the repulsive forces are generated among the magnetic fields Hc, Hc' and the magnetic field Hm of the permanent magnet 15 so that the permanent magnet 15 is rotated in the same direction as described above.

Figure 9:
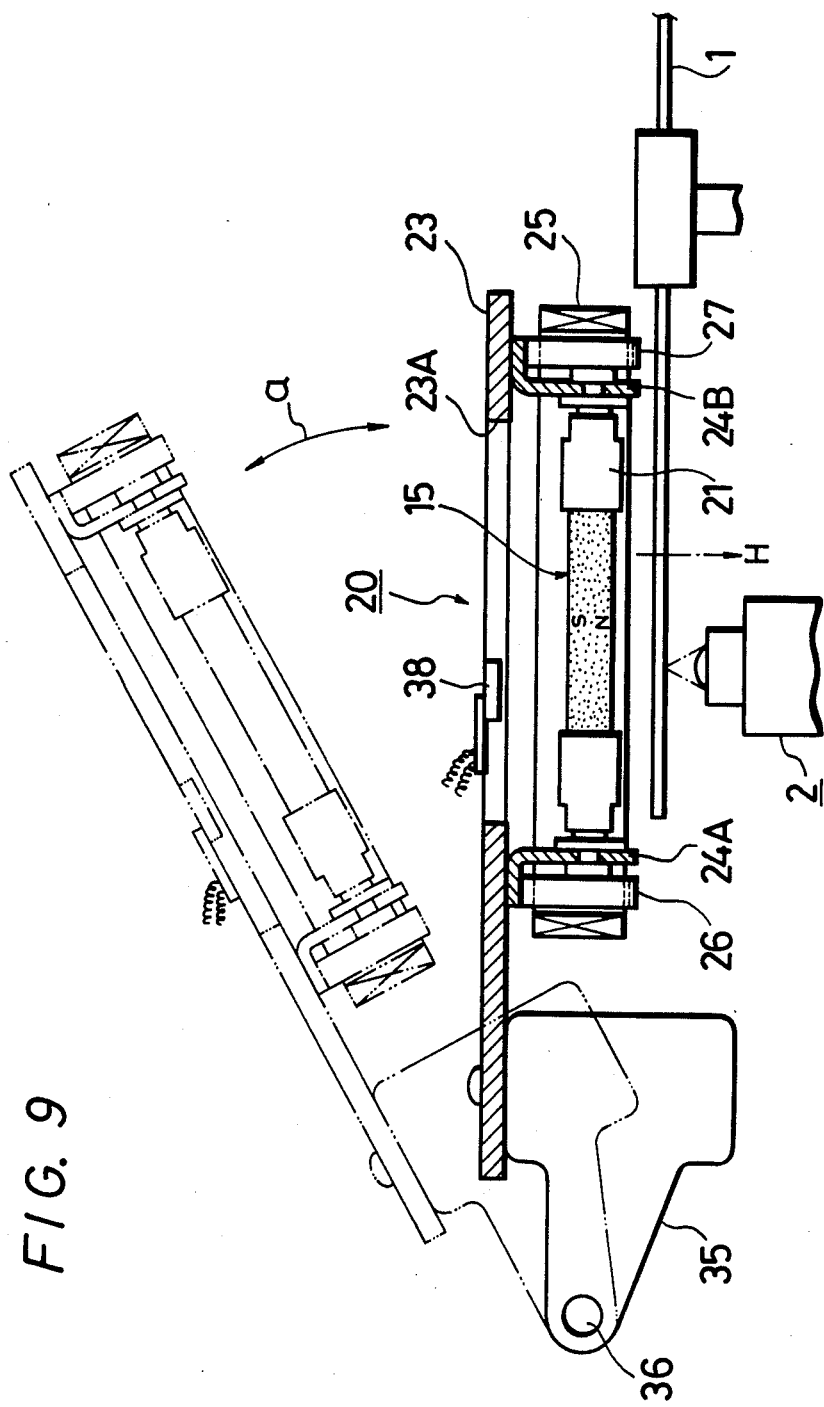
FIG. 9 is a partially cross-sectional view showing an example of a magneto-optical disc apparatus in which the external magnetic field inverting apparatus is mounted.

The external magnetic field inverting apparatus 20 which is operated in this way, as shown in FIG. 9, is attached at its main attaching plate 23 to a rotary plate 35 and the rotary plate 35 is rotated around a pivotal point 36 as shown by an arrow a. Accordingly, when the optical disc 1 is loaded to the apparatus, the external magnetic field inverting apparatus 20 is rotated as shown by a two-dot chain line and then the disc is loaded to the apparatus with ease. After the disc is loaded to the apparatus, it is rotated as shown by a solid line and thereby the permanent magnet 15 is opposed to the disc 1 as shown in the figure.

Under this state, the data is recorded on the disc and reproduced therefrom. For example, when a predetermined data ("0" or "1") is recorded on the disc surface, if the optical pickup apparatus 2 is moved to the recording position and under this state, the laser is irradiated on the disc surface, it is possible to record on the disc a data corresponding to the direction of the external magnetic field Hm generated by the permanent magnet 15. When recording a data different from the above data, the opposing polarity of the permanent magnet 15 relative to the disc surface is inverted by conducting the winding 25 and under this state, the laser is irradiated on the disc surface.

According to the present invention as described above, although the rotation force is applied to the permanent magnet 15 by displacing the center of the magnetic field Hm of the permanent magnet 15 itself and the center of the magnetic field Hc of the external winding from each other, the means for giving the rotation force to the permanent magnet 15 is not limited to the embodiment shown in FIG. 5.

An example of other means will be described with reference to FIG. 10 and the following drawings.

Figure 10:
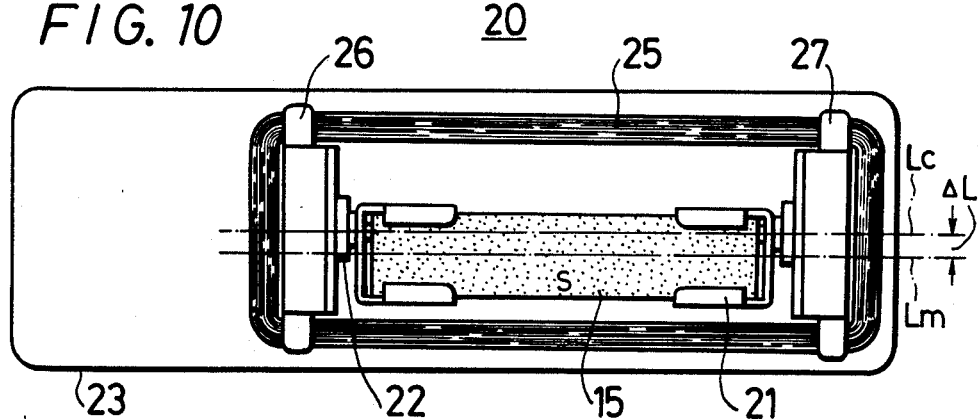
FIG. 10 is a plan view showing a second embodiment of the present invention.

In the second embodiment shown in FIG. 10, the attaching position of the rotary shaft 22 attached to the holder 21 of the permanent magnet 15 is displaced by ΔL from the center Lm of the permanent magnet 15 and the rotary shaft 22 coincides with the center Lc of the winding 25.

Even according to this arrangement, since the right magnetic field and the left magnetic field with respect to the rotary shaft 22 of the permanent magnet 15 are different in magnitude, the similar repulsive forces are generated and hence the permanent magnet 15 can be rotated in the desired direction.

Figure 11:
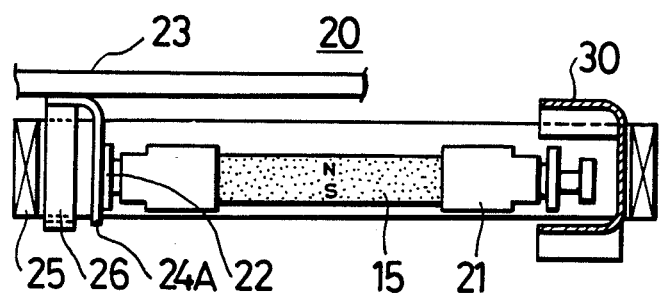
FIG. 11 is a side view showing a third embodiment of the present invention.
Figure 12:
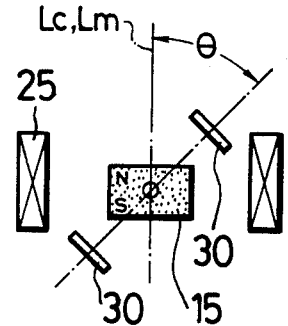
FIG. 12 is a schematic cross-sectional view of a main portion of FIG. 11.

In a third embodiment shown in FIG. 11, there is employed a permanent magnet 15 constructed to have the center Lm thereof coincident with the axis of the rotary shaft 22 or the permanent magnet 15 shown in FIG. 5. As shown in FIG. 12, a positional relationship therebetween is selected such that both the centers Lc and Lm become coincident and a substantially C-shaped magnetic conductive member, for example, an iron member 30 is fixed to the side of the bearing portion of one rotary shaft 22 with the inclination of a predetermined angle θ relative to the axis.

If this iron member 30 is provided, there is formed such a magnetic path that the magnetic flux of the winding 25 passe through the iron member 30 so that the magnetic field Hc of the winding is inclined by the angle θ relative to the magnetic field Hm of the permanent magnet 15. As a result, the rotation force for the permanent magnet 15 is generated by the composed magnetic field and hence, the permanent magnet 15 is rotated in the predetermined direction similarly as described above.

Figure 13:
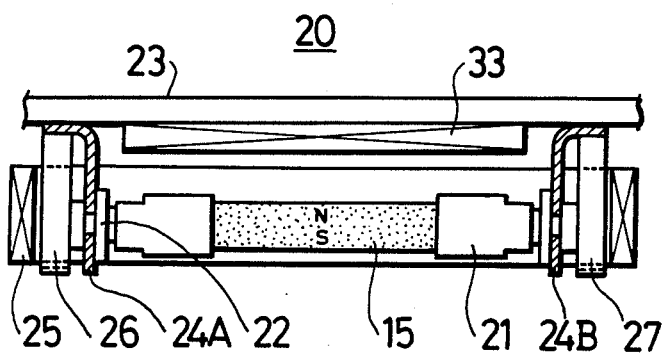
FIG. 13 is a side view showing a fourth embodiment of the present invention.

In a fourth embodiment shown in FIG. 13, the iron member 30 shown in FIG. 11 is exchanged with a short-circuit winding 33. As shown in the figure, the permanent magnet 15 similar to that of FIG. 5 is located along the center Lc of the winding 25 and the short-circuit winding 33 is located in opposing relation to one surface of the permanent magnet 15.

Figure 14:
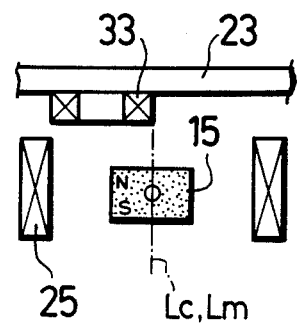
FIG. 14 is a schematic cross-sectional view of a main portion in FIG. 13.

That is, in this embodiment as shown in FIG. 14, the short-circuit winding is located with a predetermined distance from the permanent magnet 15 at the upper surface side of the permanent magnet 15 and at the left of the rotary shaft 22 of the permanent magnet.

When the apparatus is constructed as described above, the magnetic flux from the winding 25 partially crosses the short-circuit winding 33 so that an electromotive force is induced therein. Then, on the basis of this electromotive force, a predetermined magnetic field is generated from the short-circuit winding 33. The composed magnetic field of this magnetic field and the magnetic field of the winding 25 is inclined by a predetermined angle, for example, θ. As a result, the same rotation force as shown in FIG. 11 is applied to the permanent magnet 15 and the permanent magnet 15 can be rotated.

According to the above mentioned embodiment, as shown in FIG. 9, the length of the permanent magnet 15 is selected to be substantially equal to the length of the track number that can be recorded on the disc 1. When a data is recorded on a predetermined track, the optical pickup apparatus 2 is moved to the corresponding track. This is only one example.

In order to check whether or not the permanent magnet 15 is inverted correctly, magnetic field inversion detecting means, for example, Hall element 38 is attached to the main attaching plate 23 opposing to the permanent magnet 15 in facing relation to an elongated opening 23A as shown in FIG. 9. Since the polarity and the detection level of the detection output from this Hall element 38 are changed dependent on the fact that the polarity of the permanent magnet 15 opposing to the Hall element 38 is the N pole or S pole and also whether or not the external magnetic field Hm passes perpendicularly the Hall element 38 from the permanent magnet 15, by this detection output, it is possible to check whether or not the permanent magnet 15 is inverted correctly and to detect the polarity thereof.

The detection output is supplied to a system controller and the irradiation condition of the laser is controlled on the detection output therefrom.

Figure 15:
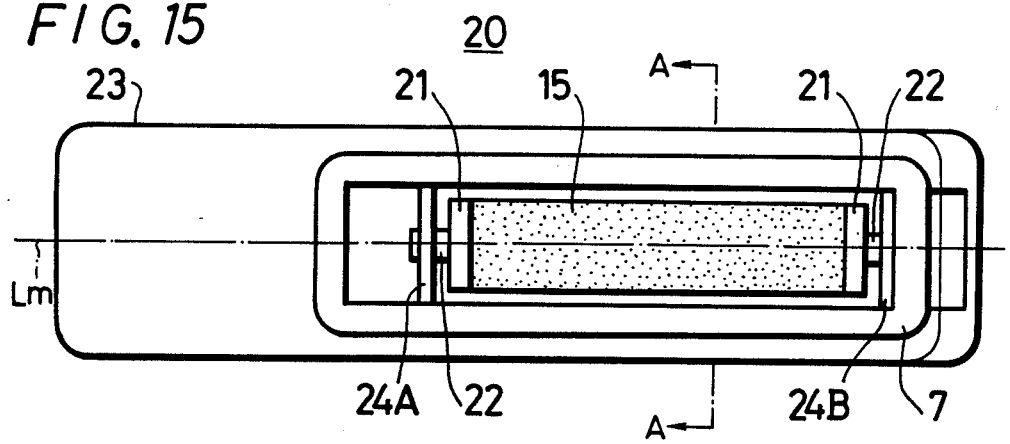
FIG. 15 is a plan view showing a fifth embodiment of the present invention.
Figure 16:
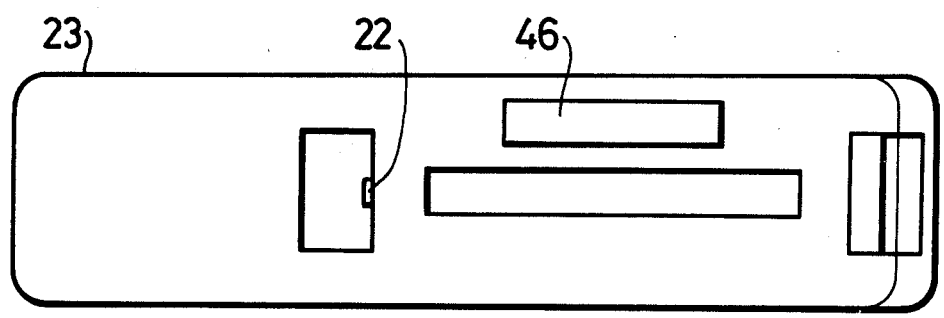
FIG. 16 is a bottom view thereof.

FIG. 15 and the following drawings illustrate a fifth embodiment. Also in the fifth embodiment, like parts corresponding to those of FIGS. 5 to 14 are marked with the same references. In this embodiment, however, the winding 25 is wound around a bobbin 40.

In this embodiment, a magnetic member 46 is located within a third quadrant III defined by a central axis 42 (X axis) of the winding 25 and an axis 44 (Y axis) perpendicular to the above mentioned central axis in the plane vertical to the rotation center Lm of the magnet 15. This magnetic member 46 is attached to the under surface of the frame 23 to be extended in the extension direction of the magnet 15.

Figure 17:
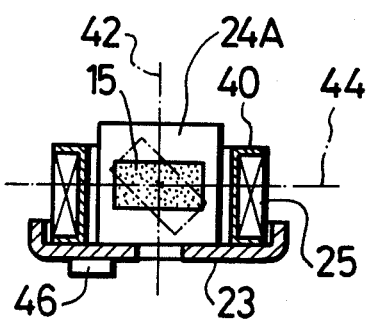
FIG. 17 is a cross-sectional view taken along a line A—A in FIG. 15

According to the arrangement as described above, when the winding 25 is not conducted, the magnet 15 is inclined as shown by a dotted line in FIG. 17, while when the winding 25 is conducted, the axis Lm of the magnet 15 is brought to the position coincident with the central axis 42 as shown by a solid line. If the flowing direction of the current is altered, this magnet 15 is inverted at the position shown by the solid line.

Figure 18:
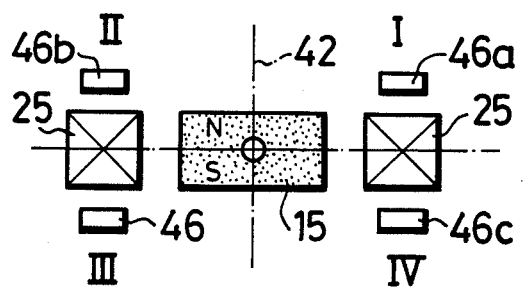
FIG. 18 is a schematic cross-sectional view showing other example in correspondence with FIG. 17.

While the magnetic member 46 is located within the third quadrant, it is possible to locate it within a first quadrant I as shown by reference numeral 46a or within a second quadrant II as shown by reference numeral 46b in FIG. 18. In this case, the magnetic member can be attached on the bobbin 40. It is needless to say that the magnetic member may be located within a fourth quadrant IV as shown by reference numeral 46c.

Further, the magnetic members may be located within the quadrants symmetrical to each other with respect to the rotation axis Lm, that is, within the first quadrant I and the third quadrant III or the second quadrant II and the fourth quadrant IV, respectively.

INDUSTRIAL APPLICABILITY

The external magnetic field inverting apparatus for magneto-optical disc apparatus according to the present invention inverts the permanent magnet by the magnetic field generated from the electromagnet winding so that this invention is suitable for use with a magneto-optical recording and reproducing apparatus such as a disc memory and the like.

We claim:

1. An external magnetic field inverting apparatus for magneto-optical disc apparatus comprising a rotatable permanent magnet located a predetermined distance from a magneto-optical disc surface in opposing relation thereto and for generating an external magnetic field passing through said disc surface perpendicularly and a winding means located so as to surround said permanent magnet, and further means for supplying current to said winding means to create a second magnetic field different from the magnetic field of said permanent magnet, permanent magnet is half-rotated by a rotation force generated on the basis of a force occurring between both of said magnetic fields and applied to said permanent magnet whereby to invert the direction of the external magnetic field generated by said permanent magnet.

2. An external magnetic field inverting apparatus for magneto-optical disc apparatus according to claim 1, characterized in that said permanent magnet is made of a rod-shaped member and supported rotatably on a frame through a rotary shaft and an axis of said rotary shaft is located in parallel to a center of said winding means located along the longitudinal direction of said permanent magnet and with a displacement of a predetermined spacing therefrom.

3. An external magnetic field inverting apparatus for magneto-optical disc apparatus according to claim 1, characterized in that said permanent magnet is made of a rod-shaped member and supported rotatably on a frame through a rotary shaft and an axis of said rotary shaft is distant with a predetermined spacing from a central line of said permanent magnet in its longitudinal direction and substantially coincides with a center of said winding located along the longitudinal direction of said permanent magnet.

4. An external magnetic field inverting apparatus for magneto-optical disc apparatus according to claim 1, characterized in that said permanent magnet is made of a rod-shaped member and supported rotatably on a frame through a rotary shaft and an axis of said rotary shaft coincides with a center of said winding means along the longitudinal direction of said permanent magnet and a magnetic member is located near said permanent magnet in such a manner that a magnetic flux generated from said winding means crosses said permanent magnet with an inclination of a predetermined angle relative to an axis perpendicular to said rotary shaft.

5. An external magnetic field inverting apparatus for magneto-optical disc apparatus according to claim 4, characterized in that said magnetic member is made of a C-shaped iron member mounted on a bearing portion of said rotary shaft.

6. An external magnetic field inverting apparatus for magneto-optical disc apparatus according to claim 1, characterized in that said permanent magnet is made of a rod-shaped member and supported rotatably on a frame through a rotary shaft, an axis of said rotary shaft coincides with a center of said winding means located along the longitudinal direction of said permanent magnet, said frame is provided with a short-circuit winding, and a composed magnetic field of a magnetic field generated from said short-circuit winding and a magnetic field generated from said winding means crosses said permanent magnet with an inclination of a predetermined angle relative to an axis perpendicular to the rotary shaft of said permanent magnet.

7. An external magnetic field inverting apparatus for magneto-optical disc apparatus according to claim 1, characterized in that said permanent magnet is made of a rod-shaped member and a magnetic member is located within at least one quadrant of first to fourth quadrants I to IV defined by axes (X and Y) passing through the center of said permanent magnet and perpendicular to each other when said permanent magnet is cut along its short axis direction.

* * * * *